US011898326B2

(12) United States Patent
Lewis

(10) Patent No.: US 11,898,326 B2
(45) Date of Patent: Feb. 13, 2024

(54) SYSTEM AND METHOD FOR LOAD CONTROL OF A LIFT ARM

(71) Applicant: CNH Industrial America LLC, New Holland, PA (US)

(72) Inventor: Brady Dorr Lewis, Peck, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/730,673

(22) Filed: Apr. 27, 2022

(65) Prior Publication Data

US 2023/0349131 A1 Nov. 2, 2023

(51) Int. Cl.
*E02F 9/22* (2006.01)
*E02F 3/84* (2006.01)

(52) U.S. Cl.
CPC ............ *E02F 9/2221* (2013.01); *E02F 3/845* (2013.01); *E02F 9/2246* (2013.01); *E02F 9/2267* (2013.01); *F15B 2211/6336* (2013.01)

(58) Field of Classification Search
CPC ..... E02F 9/2221; E02F 9/2235; E02F 9/2246; F15B 2211/6336
See application file for complete search history.

(56) References Cited

U.S. PATENT DOCUMENTS

| | | | | |
|---|---|---|---|---|
| 6,234,254 | B1 * | 5/2001 | Dietz | A01B 67/00 172/3 |
| 10,494,790 | B2 | 12/2019 | Duppong et al. | |
| 10,533,300 | B1 | 1/2020 | Armas | |
| 10,662,614 | B2 | 5/2020 | Eckrote | |
| 10,731,318 | B2 | 8/2020 | Seacat et al. | |
| 11,111,646 | B2 | 9/2021 | Lewis | |
| 2008/0082239 | A1 * | 4/2008 | Anderson | E02F 9/2253 701/50 |
| 2013/0045072 | A1 * | 2/2013 | Jensen | E02F 9/2087 701/50 |
| 2013/0259620 | A1 * | 10/2013 | Shirao | E02F 9/2296 701/50 |
| 2014/0180551 | A1 * | 6/2014 | Shirao | E02F 3/422 701/50 |
| 2018/0015927 | A1 * | 1/2018 | Mitchell | B60W 10/18 |
| 2018/0245306 | A1 | 8/2018 | Lewis | |
| 2019/0368162 | A1 * | 12/2019 | Agnew | E02F 9/02 |
| 2020/0256036 | A1 * | 8/2020 | Hodel | E02F 9/2253 |

* cited by examiner

*Primary Examiner* — Thomas E Lazo
(74) *Attorney, Agent, or Firm* — Peter K. Zacharias

(57) ABSTRACT

An arm load control system for a work vehicle including a controller comprising a memory and a processor. The controller is configured to determine whether a lift arm is in a maximum load configuration based on a position of the lift arm relative to a chassis of the work vehicle and output a control signal to a propulsion assembly of the work vehicle indicative of instructions to adjust a tractive effort of the work vehicle based on whether the lift arm is in the maximum load configuration.

20 Claims, 4 Drawing Sheets

SYSTEM AND METHOD FOR LOAD CONTROL OF A LIFT ARM

BACKGROUND

The present disclosure relates generally to a system and a method for load control of a lift arm of a work vehicle.

Certain work vehicles (e.g., tractors, skid steers, etc.) include a cab configured to house an operator and a chassis configured to support the cab. Various mechanical components of the work vehicle, such as a motor, a transmission, and a hydraulic system, among other components, may be supported by the chassis and/or disposed within an interior of the chassis. Additionally, an arm may be movably coupled to the chassis, and the arm may support an implement (e.g., dozer blade, grapple, etc.). For example, the arm may support a dozer blade to facilitate earth-moving operations, which may cause a horizontal force to be exerted on the dozer blade and the arm. Accordingly, a stop may be coupled to the chassis, and the arm may be positioned to engage the stop prior to initiating earth-moving operations. Engagement of the arm with the stop facilitates transfer of the horizontal force to the chassis.

SUMMARY

In certain embodiments, an arm load control system for a work vehicle including a controller comprising a memory and a processor. The controller is configured to determine whether a lift arm is in a maximum load configuration based on a position of the lift arm relative to a chassis of the work vehicle and output a control signal to a propulsion assembly of the work vehicle indicative of instructions to adjust a tractive effort of the work vehicle based on whether the lift arm is in the maximum load configuration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
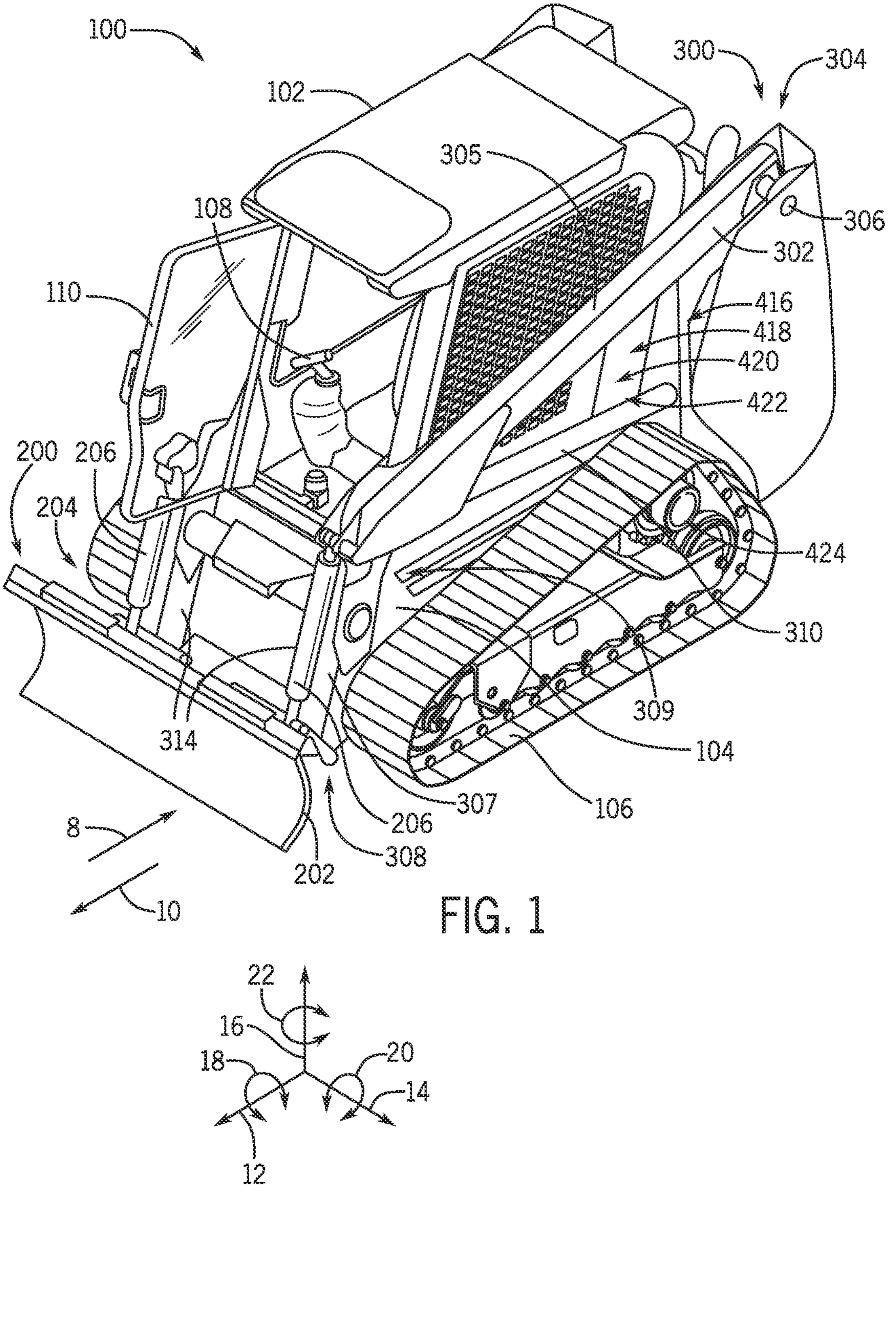
FIG. 1 is a perspective view of an embodiment of a work vehicle having an arm assembly.

FIG. 1 is a perspective view of an embodiment of a work vehicle 100 having an arm assembly. In certain embodiments, the work vehicle 100 and/or the arm assembly may be controlled by an arm load control system, as discussed in detail below. In the illustrated embodiment, the work vehicle 100 is a skid steer. However, in other embodiments, the arm load control system disclosed herein may be utilized on other suitable work vehicles, such as tractors and dozers, among other suitable work vehicles. In the illustrated embodiment, the work vehicle 100 includes a cab 102 and a chassis 104. In certain embodiments, the chassis 104 is configured to support and/or house a propulsion assembly 416. The propulsion assembly 416 may include a motor 418 (e.g., diesel engine, etc.) and a hydraulic system, and the motor 418 may be coupled to a hydraulic pump 420 of the hydraulic system. The hydraulic system may also include a valve assembly 422 and hydraulic motors 424. The motor 418 may drive the hydraulic pump 420 to pressurize the hydraulic system, and the motor 418 and/or the valve assembly 422 may be controlled to control the rotation speed of the hydraulic motors 424, thereby controlling the speed, tractive effort, and/or direction of the work vehicle 100. The chassis 104 may also support and/or house a transmission, gears, other suitable components (e.g., an electrical system, a cooling system, a sensor system, etc.) that facilitate operation of the work vehicle 100, or a combination thereof. In addition, the chassis 104 is configured to support the cab 102 and tracks 106. The tracks 106 may be driven to rotate by the propulsion assembly 416. While the illustrated work vehicle 100 includes tracks 106, in other embodiments, the work vehicle 100 may include wheels or a combination of wheels and tracks.

The cab 102 is configured to house an operator of the work vehicle 100. Accordingly, various controls, such as the illustrated hand controller 108, are positioned within the cab 102 to facilitate operator control of the work vehicle 100. For example, the controls may enable the operator to control the rotation speed of the tracks 106, thereby facilitating adjustment of the speed, the tractive effort, and/or the direction of the work vehicle 100. In the illustrated embodiment, the cab 102 includes a door 110 to facilitate ingress and egress of the operator from the cab 102.

In the illustrated embodiment, the work vehicle 100 includes a front implement assembly 200 having a front implement, such as the illustrated dozer blade 202. As illustrated, the dozer blade 202 is positioned forward of the chassis 104 relative to a forward direction of travel 10. The dozer blade 202 and/or the work vehicle 100 may experience an opposing horizontal force (e.g., load) 8 during earth-moving operations with the dozer blade 202. In addition, the front implement assembly 200 includes a front implement actuator assembly 204 to control a position of the dozer blade 202 relative to the chassis 104. In the illustrated embodiment, the front implement actuator assembly 204 includes hydraulic cylinders 206 configured to move the dozer blade 202 relative to the chassis 104. In certain embodiments, the front implement actuator assembly 204 may be configured to move the dozer blade 202 along a longitudinal axis 12 of the work vehicle 100, along a lateral axis 14 of the work vehicle 100, along a vertical axis 16 of the work vehicle 100, or a combination thereof. In addition, the front implement actuator assembly 204 may be configured to rotate the dozer blade 202 about the longitudinal axis 12 in roll 18, about the lateral axis 14 in pitch 20, about the vertical axis 16 in yaw 22, or a combination thereof. While the front implement actuator assembly 204 includes a dozer blade in the illustrated embodiment, in other embodiments, the front implement assembly 200 may include other suitable type(s) of implement(s) (e.g., a bucket, a broom, an augur, a grapple, etc.). In addition, while the front implement actuator assembly 204 includes hydraulic cylinders 206 in the illustrated embodiment, in other embodiments, the front implement actuator assembly may include other suitable type(s) of actuator(s) (e.g., alone or in combination with hydraulic cylinder(s)), such as hydraulic motor(s), pneumatic actuator(s), electromechanical actuator(s), other suitable type(s) of actuator(s), or a combination thereof.

In the illustrated embodiment, the work vehicle 100 includes an arm assembly 300 configured to support the front implement assembly 200. The arm assembly 300 includes an arm 302 rotatably coupled to the chassis 104 of the work vehicle 100. As illustrated, a first end 304 of the arm 302 is rotatably coupled to the chassis 104 at pivot joints 306, and a second end 308 of the arm 302 is coupled to the implement assembly 200. In the illustrated embodiment, the arm 302 includes a substantially horizontal portion 305, a substantially vertical portion 307, and a transition portion 309 between the substantially horizontal portion 305 and the substantially vertical portion 307.

The arm assembly 300 also includes lift cylinders 310 (e.g., lift actuators) coupled to the arm 302 and to the chassis 104. The lift cylinders 310 are configured to rotate the arm 302 relative to the chassis 104 to control a position of the implement assembly 200 (e.g., the dozer blade 202 of the implement assembly 200) along the vertical axis 16. While the illustrated arm assembly 300 is configured to include two lift cylinders 310 (e.g., one on each lateral side of the work vehicle), in other embodiments, the arm assembly may include any suitable number of lift cylinders, such as 1, 3, 4, 5, 6, or more. Furthermore, while the arm assembly includes hydraulic lift cylinder(s) in the illustrated embodiment, in other embodiments, the arm assembly may include other suitable lift actuator(s) (e.g., alone or in combination with the hydraulic lift cylinder(s)), such as electromechanical linear actuator(s), pneumatic actuator(s), hydraulic motor(s), other suitable type(s) of actuator(s), or a combination thereof, to control the position of the arm.

In certain embodiments, positioning the arm 302 in the illustrated lowered position (e.g., during earth-moving operations with the dozer blade 202) may transition the arm 302 to a maximum load configuration, in which the arm 302 may support a horizontal load equal to a first maximum horizontal load rating of the arm. For example, the arm 302 may be configured to support a larger horizontal load while the arm is in the lowered position, and the arm may be configured to support a smaller horizontal load while the arm is in a raised position. The lowered position may enable the arm 302 to transfer a portion of the horizontal load 8 (e.g., a substantial portion of the horizontal load) to the chassis 104 at/proximate to the location of the front implement assembly 200, thereby enabling the arm to support a horizontal load greater than the load capacity of the pivot joints 306. However, when the arm 302 is in the raised position, the arm may have a second maximum horizontal load rating, significantly less than the first maximum horizontal load rating, that is based on the load capacity of the pivot joints 306. As such, the horizontal force 8 exerted on the arm 302 may be controlled during operation of the work vehicle 100 based on whether the arm is in the lowered position/maximum load configuration, as discussed in detail below.

Furthermore, in the illustrated embodiment, the work vehicle 100 includes mechanical stop(s) 314 to support the arm 302 of the arm assembly 300 while the arm is in the illustrated lowered position. The mechanical stop(s) 314 are configured to transfer a portion of the horizontal load 8 (e.g., a substantial portion of the horizontal load) from the arm 302 of the arm assembly 300 to the chassis 104, thereby enabling the arm 302 to support a larger horizontal load. To support the arm 302 of the arm assembly 300, the mechanical stop(s) 314 engage (e.g., direct contact, indirect contact via another element) with the arm while the arm is in the lowered position. The mechanical stop(s) 314 are attached to the chassis 104 of the work vehicle 100 on a lower front portion of the chassis 104. The mechanical stop(s) 314 are configured to engage with portion(s) of the arm 302 of the arm assembly 300 that are positioned proximate to the lower front portion of the chassis 104, thereby facilitating transfer of the horizontal load to the chassis 104 at/proximate to the location of the front implement assembly 200. Because the mechanical stop(s) 314 support the arm 302 of the arm assembly 300 while the arm 302 is in the lowered position/maximum load configuration, the dozer blade 202 may support larger horizontal forces 8 while the arm 302 is in the lowered position. The work vehicle may include any suitable number of mechanical stops (e.g., 0, 1, 2, 3, 4, 5, 6, or more). In some embodiments, the mechanical stops may be omitted, and the arm may directly engage with the chassis while the arm is in the lowered position. While the implement is a dozer blade in this embodiment, in other embodiments, the implement may be another suitable implement.

Figure 2:
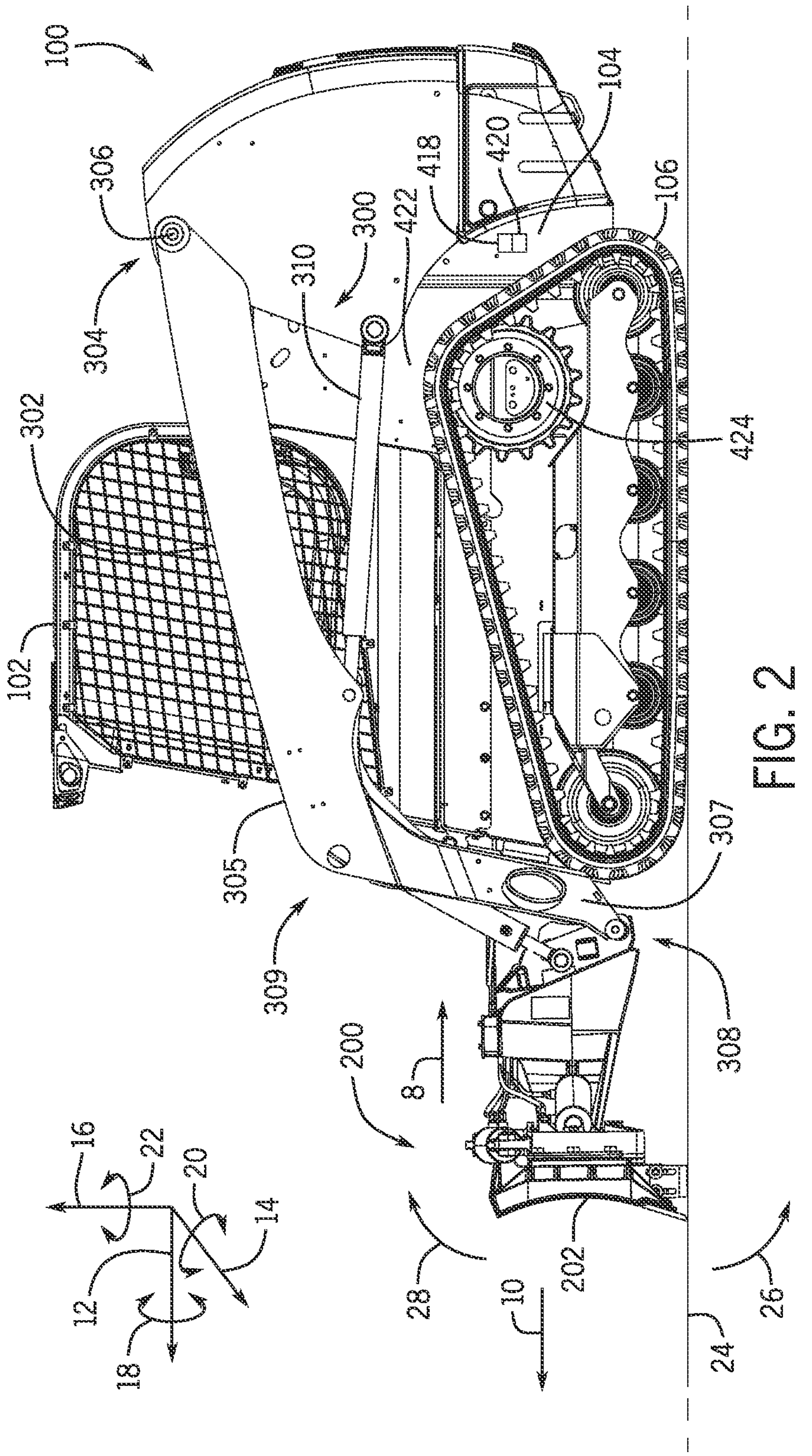
FIG. 2 is a side view of the work vehicle of FIG. 1, in which the arm of the arm assembly is in a lowered position.

FIG. 2 is a side view of the work vehicle 100 of FIG. 1, in which the arm 302 of the arm assembly 300 is in a lowered position. As previously discussed, the lowered position of the arm corresponds to the maximum load configuration of the arm 302. As illustrated, while the arm 302 is in the lowered position, the dozer blade 202 is in contact with the ground 24. Accordingly, in the illustrated embodiment, the lowered position of the arm 302 corresponds to the minimum height of the dozer blade 202 relative to the ground 24 along the vertical axis 16. While the arm 302 is in the lowered position, the arm 302 may be supported by the mechanical stop(s) or in engaged with the chassis 104, thereby blocking movement of the arm 302 toward the chassis 104 along the longitudinal axis 12. Accordingly, the lowered position of the arm 302 corresponds to the maximum load configuration of the arm because the horizontal load 8 (e.g., longitudinal load) may be transferred from the arm 302 to the chassis 104 at/proximate to the location of the front implement assembly 200.

In the illustrated embodiment, the work vehicle 100 is configured to move in a forward direction of travel 10 via the tracks 106. The tracks 106 may be driven to rotate by the propulsion assembly 416 which may include a motor 418 and a hydraulic system. As described herein, the motor 418 may be coupled to a hydraulic pump 420, a valve assembly 422, and hydraulic motors 424. As the work vehicle 100 moves in the forward direction of travel 10, the dozer blade 202 and the arm 302 may experience an opposing horizontal force 8. The horizontal force 8 exerted onto the arm 302 is dependent on a tractive effort (e.g., speed of the work vehicle, force applied by work vehicle to ground) of the work vehicle 100. For example, the arm 302 may experience a greater horizontal force 8 when the work vehicle is operated at higher speeds. In another example, the amount of force applied by the work vehicle 100 to the ground or the conditions of the ground may affect the tractive effort of the work vehicle 100, thereby affecting the horizontal force 8 exerted on the arm 302. Accordingly, as discussed in detail below, the tractive effort of the work vehicle 100 may be controlled based on whether the arm is in the maximum load configuration.

In the illustrated embodiment, the arm 302 may support a larger horizontal load 8 in the lowered position/maximum load configuration because the arm 302 is supported by the mechanical stop(s) 314 or engaged with the chassis 104. As such, the arm 302 may transfer a portion of the horizontal load 8 (e.g., a substantial portion of the horizontal load) to the chassis 104 without the portion of the load passing through the length of the arm 302 and through the pivot joints 306 to the chassis 104. In certain embodiments, the arm 302 may be supported by mechanical stop(s) 314 and transfer a portion of the horizontal load 8 through the mechanical stop(s) 314 to the chassis 104. Furthermore, in certain embodiments, the lowered position of the arm may correspond to the position of the arm while the lift cylinder (s) are fully retracted and/or to the position of the arm while movement (e.g., rotation) of the arm in a downward direction 26 is blocked. As previously discussed, the arm 302 may support a horizontal load equal to the first maximum horizontal load of the arm while the arm 302 is in the illustrated lowered position/maximum load configuration.

Furthermore, the arm 302 may be in a raised position, in which the arm is not engaged (e.g., direct contact, indirect contact via another element) with the mechanical stop(s) 314 or the chassis 104. While the arm 302 is in the raised position, the dozer blade 202 is positioned at a height above the ground 24 along the vertical axis 16. To increase the height of the dozer blade 202 above the ground 24 along the vertical axis 16, the lift cylinder(s) 310 may be extended, thereby driving the arm 302 to rotate in an upward direction 28 about the pivot joints 306. While the arm 302 is configured to rotate about the pivot joints 306 between the lowered position and the raised position in the illustrated embodiment, in other embodiments, the arm may be configured to translate substantially along the vertical axis between the lowered position and the raised position.

Figure 3:
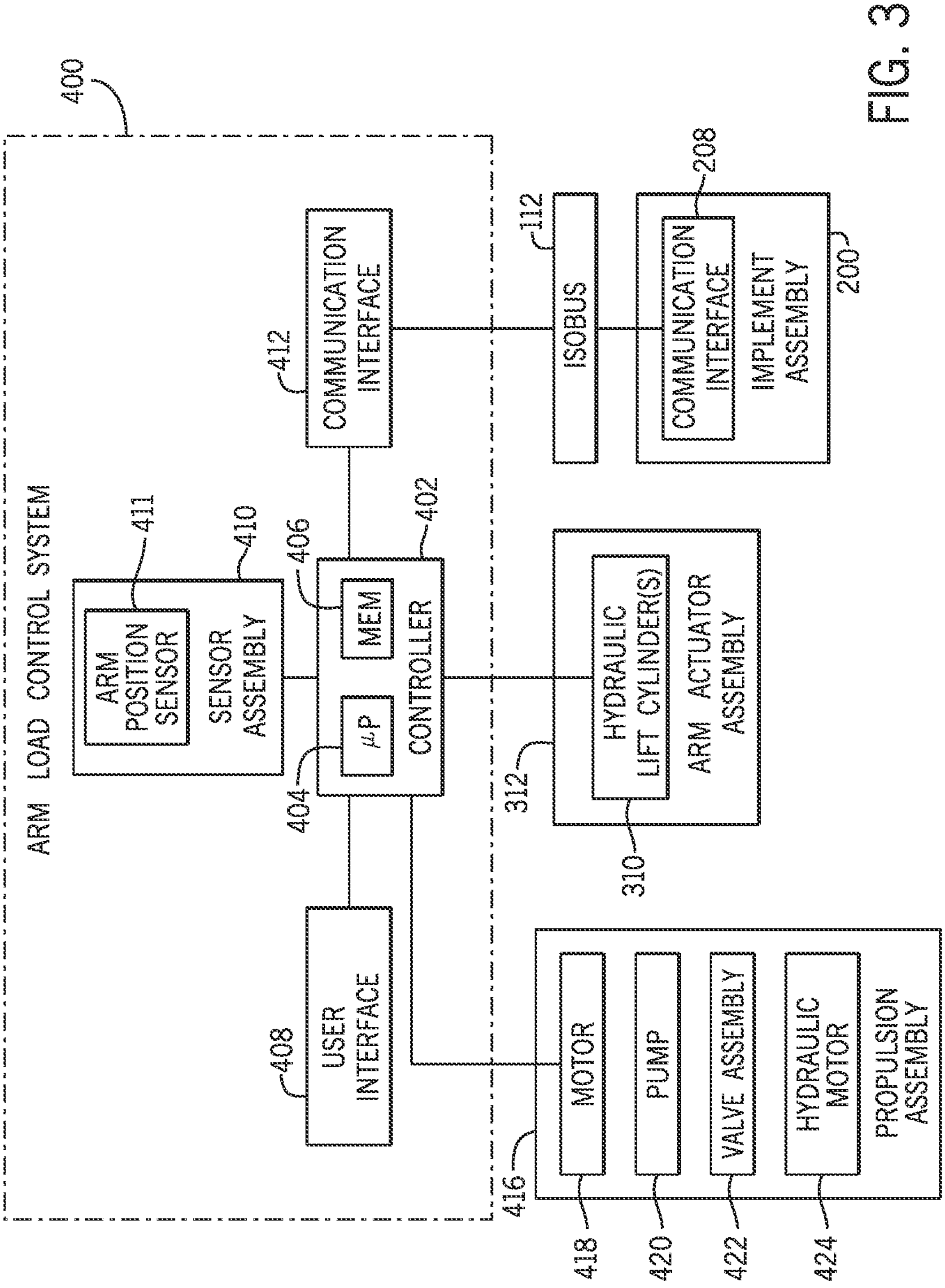
FIG. 3 is a schematic diagram of an embodiment of an arm load control system that may be employed to control the work vehicle of FIG. 1.

FIG. 3 is a schematic diagram of an embodiment of an arm load control system 400 that may be employed to control the arm assembly of FIG. 1. In the illustrated embodiment, the arm load control system 400 includes a controller 402 configured to receive a signal (e.g., a sensor signal) indicative of the position of the arm relative to the chassis. The controller 402 is also configured to output a signal (e.g., a control signal) indicative of a tractive effort (e.g., speed, force) of the work vehicle 100. Furthermore, in certain embodiments, the controller 402 is configured to receive a signal indicative of an input tractive effort of the work vehicle 100. As discussed in detail below, the tractive effort control signal (e.g., control signal) may be output to the propulsion assembly 416, which includes the motor 418, the hydraulic pump 420, the valve assembly 422, and the hydraulic motors 424, in the illustrated embodiment, to control the tractive effort of the work vehicle.

In certain embodiments, the controller 402 is an electronic controller having electrical circuitry configured to control the propulsion assembly 416. In the illustrated embodiment, the controller 402 includes a processor, such as the illustrated microprocessor 404, and a memory device 406. The controller 402 may also include one or more storage devices and/or other suitable components. The processor 404 may be used to execute software, such as software for controlling the propulsion assembly 416, and so forth. Moreover, the processor 404 may include multiple microprocessors, one or more "general-purpose" microprocessors, one or more special-purpose microprocessors, and/or one or more application specific integrated circuits (ASICS), or some combination thereof. For example, the processor 404 may include one or more reduced instruction set (RISC) processors.

The memory device 406 may include a volatile memory, such as random access memory (RAM), and/or a nonvolatile memory, such as read-only memory (ROM). The memory device 406 may store a variety of information and may be used for various purposes. For example, the memory device 406 may store processor-executable instructions (e.g., firmware or software) for the processor 404 to execute, such as instructions for controlling the propulsion assembly 416, and so forth. The storage device(s) (e.g., nonvolatile storage) may include ROM, flash memory, a hard drive, or any other suitable optical, magnetic, or solid-state storage medium, or a combination thereof. The storage device(s) (e.g., having non-transitory, tangible, machine-readable medium/media) may store data, instructions (e.g., software or firmware for controlling the propulsion assembly 416, etc.), and any other suitable data.

The controller 402 is configured to control the propulsion assembly 416 to control the tractive effort of the work vehicle (e.g., in response to operator input). For example, in the illustrated embodiment, the arm load control system 400 includes a user interface 408 communicatively coupled to the controller 402. The user interface 408 may include a display (e.g., a touch screen display), controls, other input devices and/or output devices, or a combination thereof. For example, the operator may input through the display of the user interface 408 an input tractive effort (e.g., target tractive effort of the work vehicle, such as a speed or the work vehicle or a force exerted by the work vehicle) for a desired operation. Additionally or alternatively, the operator may use the display of the user interface 408 to control a target position of the arm during the desired operation. In another example, the operator may operate controls of the user interface 408, such as hand controllers, to control the speed, tractive effort, and/or direction of the work vehicle and/or the position of the arm.

In addition, the arm load control system 400 includes a sensor assembly 410 communicatively coupled to the controller 402. The sensor assembly 410 may include an arm position sensor 411 configured to output a signal to the controller 402 indicative of a position of the arm relative to the chassis. For example, the arm position sensor 411 may include a linear variable differential transformer (LVDT), a potentiometer, an infrared sensor, an ultrasonic sensor, a proximity sensor, a pressure sensor, any other suitable sensor configured to output a signal indicative of the position of the arm, or a combination thereof. In certain embodiments, the arm position sensor 411 may be integrated within a hydraulic lift cylinder, within a pivot joint, or both. For example, the arm position sensor 411 integrated with the hydraulic lift cylinder may output a signal indicative of an amount of extension of the cylinder, which is indicative of the position of the arm. In other embodiments, the arm position sensor may be integrated within the chassis, the mechanical stop(s), or both. For example, the arm position sensor 411 within the chassis/mechanical stop(s) may output a signal indicative of engagement between the arm and the chassis/mechanical stop(s), which is indicative of the position of the arm. The controller 402 may determine whether the arm is in the lowered position or the raised position based on the signal from the arm position sensor 411. Accordingly, the controller 402 may determine whether the arm is in the maximum load configuration based on the position of the arm.

In certain embodiments, the sensor assembly 410 may also include a sensor to measure a force of the work vehicle 100 by monitoring in the hydraulic system. For example, the sensor may be located between the pump 420 and the motor 418 and configured to measure a flow rate, thereby monitoring the force exerted on the arm by the work vehicle 100. In another example, the sensor may measure a pressure within the propulsion assembly 416, which may be indicative of the force exerted on the arm. The controller 402 may determine the horizontal load on the arm based on the pressure or flow rate of the propulsion assembly.

In certain embodiments, the arm load control system 400 includes a communication interface 412 communicatively coupled to the controller 402 and configured to receive signal(s) indicative of an tractive effort (e.g., a speed for operating the work vehicle, a force exerted by the work vehicle during operation) and/or a target position (e.g., lowered, raised) of the arm and to output signal(s) indicative of the target position of the arm and/or the tractive effort. In the illustrated embodiment, the arm load control system communication interface 412 is communicatively coupled to a implement assembly communication interface 208 via an ISOBUS network 112. The ISOBUS network 112 is configured to convey the signal(s) from the arm load control system communication interface 412 to the implement assembly communication interface 208. While the communication interfaces are communicatively coupled to one another via an ISOBUS network in the illustrated embodiment, in other embodiments, the communication interfaces may be communicatively coupled to one another by any other suitable communication system (e.g., CAN bus, Ethernet, Wi-Fi, Bluetooth, etc.). While the illustrated arm load control system 400 includes a user interface 408, a sensor assembly 410, and a communication interface 412, in other embodiments, at least one of the user interface, the sensor assembly, and the communication interface may be omitted. Furthermore, in certain embodiments, the controller may be configured to receive the signal(s) indicative of the tractive effort of the work vehicle and/or the target position of the arm from another suitable system/device (e.g., hand controllers, pedals, etc.).

In the illustrated embodiment, the work vehicle includes the arm actuator assembly 312 configured to control the position of the arm. The controller 402 is configured to control movement of the arm by outputting a signal (e.g., a control signal) to the arm actuator assembly 312. In the illustrated embodiment, the arm actuator assembly 312 includes the hydraulic lift cylinder(s) 310, which are configured to move the arm of the work vehicle. In certain embodiments, the user interface 408 is configured to inform the operator when the arm has reached a target position. For example, if the operator instructs the arm to move downwardly to the lowered position, the controller 402 may output a signal to the user interface 408 when the arm reaches the lowered position and is in the maximum load configuration. The user interface 408, in turn, may provide a visual and/or audible indication that the arm has reached the lowered position. In addition, the user interface 408 may provide a visual and/or audible indication that the arm is in the maximum load configuration. In another example, if the operator instructs the arm to move upwardly, the controller may output a signal to the user interface 408 when the arm leaves the lowered position and is not in the maximum load configuration. The user interface 408, in turn, may provide a visual and/or audible indication of the raised position and/or the maximum load configuration of the arm.

The work vehicle also includes the propulsion assembly 416 configured to control the tractive effort (e.g., speed, force) of the work vehicle. In certain embodiments, the controller 402 is configured to control the tractive effort of the work vehicle based on user input (e.g., from the user display, hand controllers, etc.). In addition, the controller 402 is configured to control the tractive effort of the work vehicle in response to determining the position of the arm (e.g., lowered, raised), thereby controlling the horizontal load on the arm (e.g., such that the horizontal load does not exceed the respective maximum horizontal load rating). In the illustrated embodiment, the propulsion assembly 416 includes the motor 418, the hydraulic pump 420, the valve assembly 422, and the hydraulic motors 424. The motor 418 is coupled to the hydraulic pump 420, and the hydraulic pump 420 is configured to provide pressurized hydraulic fluid to the hydraulic motors 424, thereby driving the hydraulic motors 424 to rotate. In addition, valve(s) of the valve assembly 422 are configured to control the flow of the hydraulic fluid to the hydraulic motors 424, thereby controlling the rotation speed of the hydraulic motors 424. In the illustrated embodiment, the tracks 106 of the work vehicle may be driven to rotate by the hydraulic motors 424. However, in other embodiments, the tracks of the work vehicle may be driven to rotate by the motor 418 (e.g., directly or via a transmission). The motor 418, the valve assembly 422, the hydraulic motors 424, or a combination thereof, may be controlled to control the tractive effort of the work vehicle. For example, to increase the tractive effort of the work vehicle, the controller 402 may output a signal to the motor 418 indicative of instructions to increase power to the hydraulic pump 420, thereby increasing fluid flow to the hydraulic motors 424. And, to decrease the tractive effort of the work vehicle, the controller 402 may output a signal to the motor 418 indicative of instructions to decrease power to the hydraulic pump 420, thereby decreasing fluid flow to the hydraulic motors 424. To stop the work vehicle, the controller 402 may output a signal to the motor 418 indicative of instructions to stop operation and/or terminate power to the hydraulic pump 420.

Furthermore, in certain embodiments, the controller 402 may receive a signal (e.g., from a user interface, a hand controller) indicative of instructions to change a tractive effort of the work vehicle and may output a signal to the valve assembly 422 indicative of instructions to control fluid flow to the hydraulic motors 424. For example, to increase the tractive effort of the work vehicle, the controller 402 may output a signal to the valve assembly 422 indicative of instructions to increase fluid flow to the hydraulic motors 424. In addition, to decreasing the tractive effort of the work vehicle, the controller 402 may output a signal to the valve assembly indicative of instructions to reduce fluid flow to the hydraulic motors 424. While the propulsion assembly 416 includes hydraulic motors and a valve assembly 422 in the illustrated embodiment, in other embodiments, the propulsion assembly 416 may include pneumatic motor(s), electric motor(s), other suitable type(s) of actuator system(s), or a combination thereof. For example, the propulsion assembly may include a hydraulic motor 424 or an electric motor and a steering system.

In certain embodiments, the propulsion assembly may include transmission(s) coupled to the motor 418 and/or the hydraulic motors 424. The transmission(s) may include one or more gears configured to control a speed of the tracks of the work vehicle. Accordingly, the controller may be configured to output a signal indicative of instructions to adjust the transmission(s), thereby controlling the tractive effort, such as the speed, of the work vehicle. Additionally, the controller is configured to output a signal indicative of instructions to change a pressure or a flowrate from the pump 420 to the hydraulic motors 424 to control a tractive effort of the work vehicle 100. While the illustrated propulsion assembly 416 includes the valve assembly 422 in the illustrated embodiment, in other embodiments, the valve assembly may be omitted. For example, the propulsion assembly may include the transmission coupled to the motor 418 to drive the tracks without the hydraulic system. The transmission may also control the tractive effort of the tracks through one or more gears.

Figure 4:
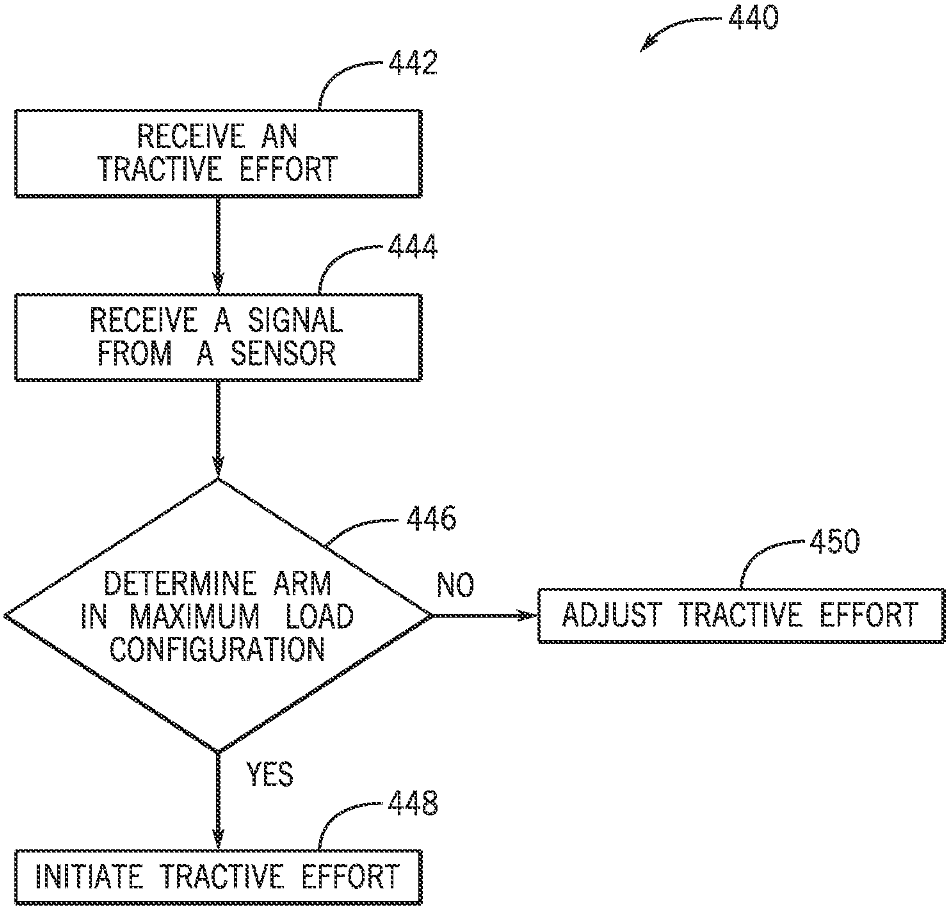
FIG. 4 is a flow diagram of an embodiment of a method for controlling a horizontal force exerted on the arm assembly.

FIG. 4 is a flow diagram of an embodiment of a method 440 for controlling the horizontal force exerted on the arm of the arm assembly. First, as represented by block 442, a signal indicative of a tractive effort (e.g., speed of the work vehicle, force of the work vehicle on the ground during operation) is received. The input tractive effort may correspond to a target tractive effort of operation of the work vehicle. As previously discussed, the signal indicative of the tractive effort may be received from a user interface, the communication interface, the hand controller, or a combination thereof. Additionally or alternatively, as represented by block 444, a signal indicative of a position (e.g., lowered, raised) of the arm relative to the chassis may be received from the sensor assembly. For example, an arm position sensor located within the chassis may output a signal indicative of engagement between the arm and the chassis, which is indicative of a position of the arm. For example, a signal indicative of engagement between the arm and the chassis may indicate the arm is in the lowered position, and a signal indicative of no engagement (e.g., no contact) may indicate the arm is in a raised position. In another example, the arm position sensor may be located within the pivot joint of the arm and output a signal indicative of an amount of rotation of the arm relative to the chassis.

Next, as represented by block 446, a determination is made regarding whether the arm is in the maximum load configuration. In certain embodiments, the determination may be made based on the position of the arm relative to the chassis. For example, the arm position sensor may output a signal indicative of the arm being in the lowered position, which is indicative of the arm engaging the mechanical stops or the chassis. In another embodiment, the user may input the arm position via the display. For example, the user may indicate whether the arm is in the maximum load configuration or whether the arm is in the lowered position, which is indicative of the arm engaging the mechanical stops or the chassis. The user may indicate to the controller via the display that the arm is in the lowered position. In another example, the user may further control a target position of the arm during the desired operation, as such the controller is configured to determine that the arm is no longer in the maximum load configuration.

In an embodiment, the controller may determine that the arm is in the maximum load configuration, and the controller may output a signal to the propulsion assembly indicative of instructions to operate at/maintain the tractive effort, as represented by block 448. The controller is configured to determine a maximum horizontal load rating of the arm and the maximum tractive effort for the work vehicle based on the maximum horizontal load rating. The controller is also configured to verify that the input tractive effort is less than or equal to the maximum tractive effort. For example, in certain embodiments, the controller is configured to determine a maximum pressure or flow rate between the pump to the motors, thereby monitoring the tractive effort of the work vehicle. Furthermore, the controller is also configured to output a signal indicative of the maximum horizontal load rating and/or the maximum tractive effort to the display of the user interface. In certain embodiments, the controller may not control the propulsion assembly until the controller receives a signal indicative of user confirmation of the determined maximum tractive effort. Accordingly, the controller is configured to output a signal to the propulsion assembly indicative of instructions to operate at the input tractive effort. Additionally or alternatively, the controller is configured to verify that operating at the desired input tractive effort create a horizontal load greater than the maximum horizontal load rating.

If the arm is not in the maximum load configuration, the tractive effort of the work vehicle may be reduced to reduce the horizontal load on the arm. For example, the controller may determine an adjusted tractive effort for the work vehicle in response to determining the arm is not in the maximum load configuration. Additionally or alternatively, the controller may determine an adjusted pressure or flow rate from the pump to the motors to adjust the horizontal load on the arm. The controller may output a signal (e.g., a control signal) to the propulsion assembly indicative of instructions to operate at the adjusted tractive effort, as represented by block 450. Limiting the tractive effort of the work vehicle may reduce the horizontal load exerted on the arm during earth-moving operations, thereby increasing the longevity of the arm. Additionally or alternatively, the controller is configured to determine the maximum horizontal load that may be exerted on the arm based on the position. The controller is configured to output a signal to the user display indicative of the adjusted tractive effort, the position of the arm, and the maximum horizontal load. The operator may view the information on the user display and select to lower the arm into the lowered position or terminate the operation.

The method described above may be stored on one or more tangible, non-transitory, machine-readable media and/or may be performed by the controller described above with reference to FIG. 3 or by another suitable controller. The steps of the method 440 may be performed in the order disclosed above or in any other suitable order. Furthermore, certain steps of the method may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An arm load control system for a work vehicle, comprising:

a controller comprising a memory and a processor, wherein the controller is configured to:

determine whether a lift arm is in a maximum load configuration corresponding to engagement between the lift arm and a chassis of the work vehicle or a mechanical stop coupled to the chassis based on a position of the lift arm relative to the chassis of the work vehicle; and output a control signal to a propulsion assembly of the work vehicle indicative of instructions to adjust a tractive effort of the work vehicle based on whether the lift arm is in the maximum load configuration.

2. The arm load control system of claim 1, comprising an arm position sensor communicatively coupled to the controller, wherein the arm position sensor is configured to output a sensor signal indicative of the position of the lift arm relative to the chassis, and the controller is configured to receive the sensor signal.

3. The arm load control system of claim 2, wherein the sensor signal is indicative of engagement of the lift arm with the chassis or the mechanical stop coupled to the chassis, disengagement of the lift arm from the chassis or the mechanical stop, or a combination thereof.

4. The arm load control system of claim 1, wherein the lift arm is configured to transfer a portion of a horizontal load exerted onto the lift arm to the chassis.

5. The arm load control system of claim 1, wherein the control signal is indicative of instructions to decrease a flow of hydraulic fluid to one or more hydraulic motors of the propulsion assembly to decrease the tractive effort of the work vehicle.

6. The arm load control system of claim 5, wherein the control signal is indicative of instructions to close a valve of a valve assembly of the propulsion assembly to decrease the flow of the hydraulic fluid to the one or more hydraulic motors.

7. The arm load control system of claim 1, wherein the controller is configured to determine a maximum operation tractive effort of the work vehicle based on whether the lift arm is in the maximum load configuration, and the controller is configured to output the control signal to adjust the tractive effort of the work vehicle to less than or equal to the maximum operation tractive effort based on determining the lift arm is not in the maximum load configuration.

8. A method for controlling a lift arm of a work vehicle, comprising:

receiving, via a controller, a first signal indicative of a position of the lift arm;

determining, via the controller, whether the lift arm is in a maximum load configuration corresponding to engagement between the lift arm and a chassis of the work vehicle or a mechanical stop coupled to the chassis based on the position of the lift arm relative to the chassis; and outputting, via the controller, a control signal indicative of instructions to adjust a tractive effort of the work vehicle based on the determination.

9. The method of claim 8, comprising:

determining, via the controller, the lift arm is in the maximum load configuration;

retrieving, via the controller, a maximum load rating of the lift arm;

determining, via the controller, a maximum tractive effort of the work vehicle based on the maximum load rating; and outputting, via the controller, the control signal indicative of instructions to operate at the maximum tractive effort of the work vehicle.

10. The method of claim 8, wherein the first signal is received, via the controller, from an arm position sensor integrated in the chassis.

11. The method of claim 10, wherein the first signal is indicative of engagement of the lift arm with the chassis or a mechanical stop coupled to the chassis, disengagement of the lift arm from the chassis or the mechanical stop, or a combination thereof.

12. The method of claim 8, comprising:

decrease or change the tractive effort of the work vehicle based on the first signal being indicative of the position of the lift arm not being in the maximum load configuration, wherein the first signal is received from a sensor integrated in a pivot joint of the lift arm.

13. The method of claim 8, wherein the first signal indicative of the position of the lift arm is received from a sensor integrated in one or more hydraulic cylinder lifts of the arm, wherein detecting an extension from the sensor is indicative of the lift arm not being in a lowered position.

14. The method of claim 8, wherein the control signal is indicative of instructions to decrease a flow of hydraulic fluid to one or more hydraulic motors of a propulsion assembly to decrease the tractive effort of the work vehicle.

15. The method of claim 14, wherein the control signal is indicative of instructions to close a valve of a valve assembly of the propulsion assembly to decrease the flow of hydraulic fluid to the one or more hydraulic motors.

16. An apparatus comprising:

at least one non-transitory, tangible, machine-readable medium having instructions encoded thereon for execution by a processor, the instructions comprising:

instructions to determine whether a lift arm is in a maximum load configuration corresponding to engagement between the lift arm and a chassis of a work vehicle or a mechanical stop coupled to the chassis based on a position of the lift arm relative to the chassis; and instructions to output a control signal to a propulsion assembly of the work vehicle indicative of instructions to adjust a tractive effort of the work vehicle based on whether the lift arm is in the maximum load configuration.

17. The apparatus of claim 16, wherein the instructions to adjust the tractive effort of the work vehicle comprise instructions to decrease the tractive effort or change the tractive effort to zero based on determining the position of the lift arm is not in the maximum load configuration.

18. The apparatus of claim 16, wherein the instructions to determine whether the lift arm is in the maximum load configuration comprise:

instructions to receive a first signal from a sensor integrated with the chassis, a mechanical stop of the chassis, a hydraulic cylinder of the lift arm, or a pivot joint of the lift arm, the first sensor signal indicative of the position of the lift arm relative to the chassis.

19. The apparatus of claim 18, wherein the instructions to output the control signal indicative of instructions to adjust the tractive effort comprise:

instructions to determine the lift arm is not in a maximum load configuration based on the first signal; and instructions to determine an adjusted tractive effort of the work vehicle based on the lift arm not being in the maximum load configuration.

20. The apparatus of claim 18, wherein the instructions to output the control signal comprise:

instructions to determine the lift arm is in the maximum load configuration based on the first signal indicative of engagement between the lift arm and the chassis or the mechanical stop of the chassis; and instructions to operate at a maximum tractive effort based on the lift arm being in the maximum load configuration.

* * * * *